Feb. 17, 1942.                S. P. HAYES                 2,273,402
                            SIRUP EVAPORATOR
                          Filed Nov. 23, 1940          2 Sheets-Sheet 1

Inventor
Sidney P. Hayes

By  Clarence A. O'Brien

Attorney

Feb. 17, 1942.  S. P. HAYES  2,273,402
SIRUP EVAPORATOR
Filed Nov. 23, 1940  2 Sheets-Sheet 2
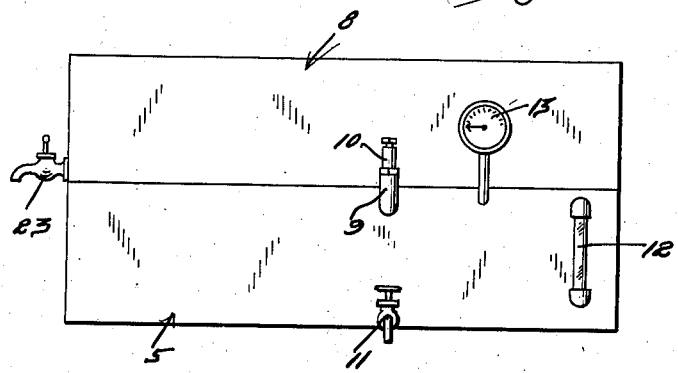
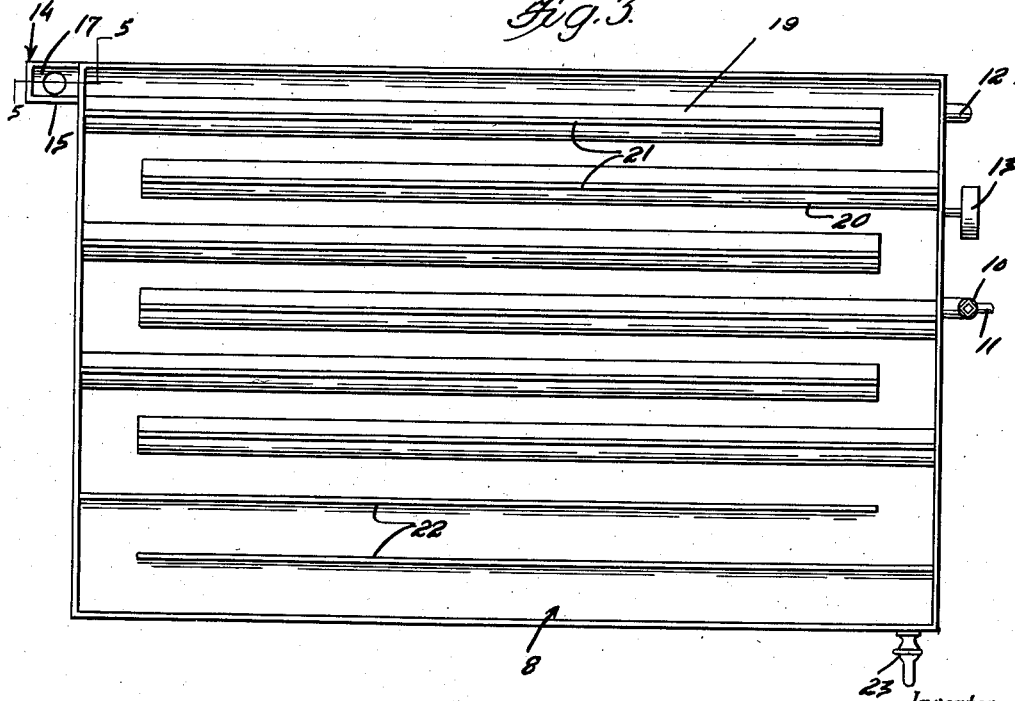
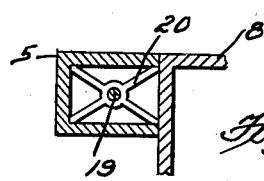
Inventor
Sidney P. Hayes
By Clarence A. O'Brien
Attorney Patented Feb. 17, 1942

2,273,402

UNITED STATES PATENT OFFICE 2,273,402

SIRUP EVAPORATOR

Sidney P. Hayes, West Valley, N. Y.

Application November 23, 1940, Serial No. 366,934

1 Claim. (Cl. 159—38)

This invention relates to sirup evaporators and an object of the invention is to provide an evaporating apparatus wherein steam is employed as the heating agent.

In addition it is an object of the invention to improve generally upon such types of evaporators as are now known and used and which employ, in the interest of economy of time and labor, steam as the heating agent.

The invention together with its objects and advantages will be best understood from a study of the following description taken in connection with the accompanying drawings wherein—

Figure 2 is an end elevational view thereof.

Figure 3 is a top plan view of the evaporator.

Figure 6 is a horizontal sectional view taken substantially on the line 6—6 of Figure 5.

Figure 1:
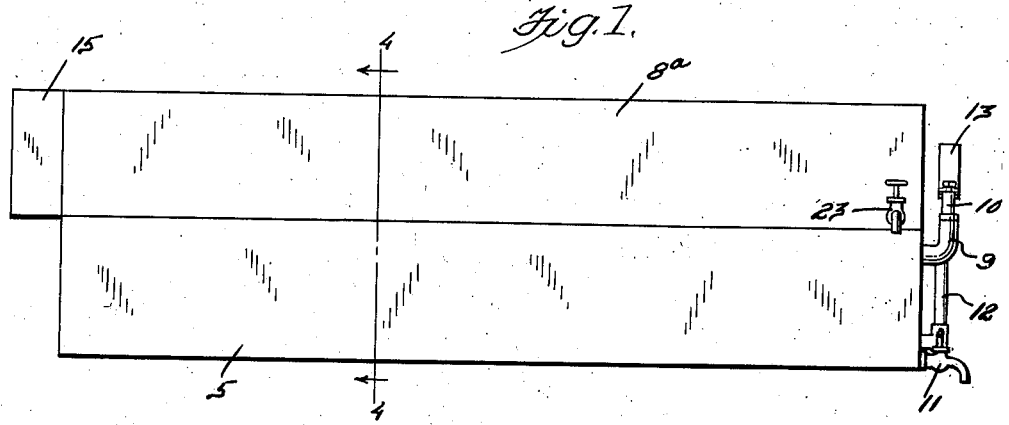
Figure 1 is a side elevational view of an evaporator forming part of the invention.

Referring more in detail to the drawings it will be seen that in the preferred embodiment thereof the evaporator comprises a substantially rectangular water chamber or box 5 that is strengthened through the medium of transverse rods 6; and above the chamber 5 an evaporating tray indicated by the reference numeral 8.

The tray 8 embodies a bottom wall 7 that forms the top of the water chamber 5, and a peripheral wall 8a.

The wall 8a is in the form of a rectangular frame the members of which, at the lower edges thereof seat in a groove 9 provided therefor externally of the water box or chamber 5 and extending about all four sides of the water chamber adjacent the top thereof.

The water chamber 5 is watertight and adapted to contain water, the water being admitted into the water box or chamber 5 through a filling neck 9 that is equipped with a safety valve 10.

The water box or chest 5 is also provided with a drain cock 11 as shown.

Also forming additional equipment are a water glass 12 and a steam gauge 13 associated with the box 5 as shown.

The juice or sap to be evaporated or concentrated is admitted into the evaporating tray 8 through a valve assembly 14 provided at one end, as shown in Figure 3, and at one corner of the tray 8.

Figure 5:
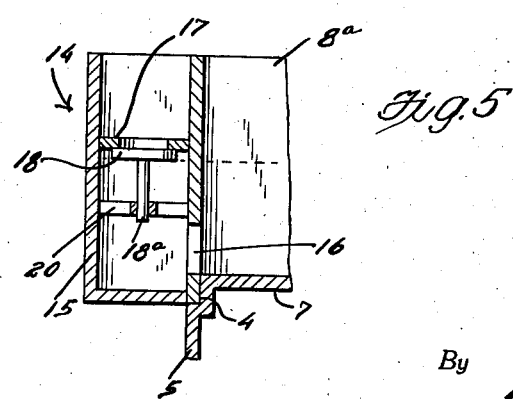
Figure 5 is a detail sectional view taken substantially on the line 5—5 of Figure 3.

As best shown in Figures 3 and 5 the valve assembly 14 embodies a valve casing 15 mounted on the wall 8a and opening at its top as shown to receive the sirup or juice, and laterally opening at the bottom of the casing 15 into the tray 8 as at 16 to permit the juice or sap to pass from the casing into the tray 8.

Mounted in the casing 15 is a valve seat 17 against the underside of which seats a float valve 18. Valve 18 is in the form of a disk having a stem 18a that works through a suitable guide 20, in the form of a spider, and suitably mounted in the casing 15 as shown. Thus it will be seen that as the level of the juice or sap in the tray 8 rises valve 18 will be caused to rise to engage its seat 17.

Obviously the weight of the fluid or juice on the valve 18 incidental to the charging of the tray 8 with such juice or sap will serve to move the valve 18 downwardly and out of engagement with the seat 17 to permit such juice or sap to pass through the valve assembly and seek its level in the tray 8.

The wall 7 forming the top of the water chamber 5 and the bottom of the tray 8 has a portion thereof corrugated to provide ribs 19 that extend inwardly from one end of the tray 8 to terminate short of the opposite end of the tray, and intermediate ribs 20 that extend inwardly from said opposite end wall of the tray 8 to terminate short of the first named end wall of said tray 6. The ribs 19 and 20 coact to form a continuous path of travel for the juice entering the tray 8 through the valve 14 at one corner of the tray and draining from the tray 8 through a discharge cock 23 provided for the tray 8 and disposed diagonally with respect to the valve 14.

Figure 4:
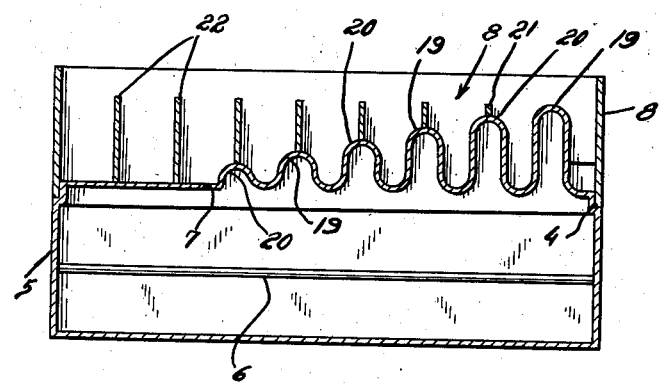
Figure 4 is a transverse sectional view taken substantially on the line 4—4 of Figure 1.

As shown in Figure 4 the ribs 19 and 20 progressively decrease in height inwardly from one longitudinal side of the tray, the innermost rib being spaced a considerable distance from the opposite longitudinal side of the tray; while rising from the top of each rib is a fin 21 elongated longitudinally of the rib, with the fins progressively decreasing in height in inverse order with respect to the ribs 19 and 20 so that the upper edges of the fins are in the same horizontal plane.

A portion of the wall 7 between the inmost rib and adjacent longitudinal wall of the tray 8 is flat and has rising therefrom fins 22 disposed in spaced parallelism; one of the fins extending inwardly from one end wall of the tray and terminating short of the opposite end wall of the tray, and the other of the fins 22 extending inwardly from the last named end wall of the tray and terminating short of the first named end wall of the tray so that the fins 22 coact with the ribs 19 and 20 in continuing the zigzag or sinuous path which the juice, during the process of evaporation must travel in passing from the inlet 14 of the tray to the outlet 23 for the tray.

Obviously the provision of the corrugations 19 and 20 will give a greater heated surface with which the juice or sap will have contact for evaporating purposes while the tortuous passage for the juice formed by the corrugations 19, 20 and fins 22 will insure the juice being subjected to the heat over a considerable period of time and thereby provide for complete evaporation or concentration of the juice or sap.

In actual practice the device is placed over a flame for heating the water in the chamber or box 5 and the steam generated is employed as a heating agent for effecting the evaporation and purifying of the juice or sap.

It will, of course, be understood that the steam will find the pockets formed by the upwardly extending corrugations and thus the sap in the pockets formed by the downwardly extending corrugations will be thoroughly heated as the sap is surrounded on three sides by the hot walls of the pockets. By having the corrugations gradually decrease in height the sap is heated to the maximum degree so that evaporation quickly takes place and then as the sap becomes thicker to form the sirup, this sirup is subjected to a less amount of heat as it is, of course, located in the short corrugations. It is well known that the sirup requires less heat than the sap for if the sirup is subject to too much heat it would boil over the device. The thicker sirup flows over the flat part of the bottom wall where it is submitted to the minimum amount of heat.

It is thought that the simplicity of the device together with its many advantages will be had by those skilled in the art without further detailed description.

While I have herein shown and described a preferred embodiment of the invention it is to be understood that I claim all such forms of the invention to which I am entitled in view of the prior art and scope of the appended claim.

Having thus described the invention, what is claimed as new is:

A sirup evaporator comprising a box and an evaporating tray provided on top of said box, said tray embodying a wall common to the tray and said box and having a corrugated section and a relatively flat section; inlet means for said tray at one corner thereof, and outlet means for said tray at a corner diagonal to said inlet means; and the corrugated section of said wall embodying ribs extending inwardly from one end of said tray and terminating short of the opposite end of said tray, and intermediate ribs extending inwardly from said opposite end of the tray and terminating short of the first named end of said tray; said ribs co-acting to provide a sinuous passage for the juice entering the tray at the inlet thereof and flowing over said wall to the outlet of said tray, said ribs progressively decreasing in height as the ribs approach the flat section of said wall, and fins rising from the crests of said ribs and the flat section of said wall with the upper edges of all of said fins being in the same horizontal plane.

SIDNEY P. HAYES.